US011241922B2

(12) United States Patent
Altman

(10) Patent No.: US 11,241,922 B2
(45) Date of Patent: Feb. 8, 2022

(54) APPARATUS THAT FACILITATES MOVING A TRAILER

(71) Applicant: John Altman, Coward, SC (US)

(72) Inventor: John Altman, Coward, SC (US)

( * ) Notice: Subject to any disclaimer, the term of this patent is extended or adjusted under 35 U.S.C. 154(b) by 177 days.

(21) Appl. No.: 16/782,207

(22) Filed: Feb. 5, 2020

(65) Prior Publication Data
US 2020/0254833 A1 Aug. 13, 2020

Related U.S. Application Data

(60) Provisional application No. 62/803,931, filed on Feb. 11, 2019.

(51) Int. Cl.
*B60D 1/06* (2006.01)
*B66F 9/075* (2006.01)

(52) U.S. Cl.
CPC .......... *B60D 1/065* (2013.01); *B66F 9/07504* (2013.01)

(58) Field of Classification Search
CPC ........ B60D 1/52; B60D 1/065; B66F 9/07504
See application file for complete search history.

(56) References Cited

U.S. PATENT DOCUMENTS

| 6,135,701 | A | * | 10/2000 | Galloway, Sr. | ........... B66F 9/18 |
| | | | | | 280/415.1 |
| 6,390,489 | B1 | * | 5/2002 | Friesen | .................... B60D 1/06 |
| | | | | | 187/237 |
| 9,469,514 | B1 | * | 10/2016 | Hendricks | ........... B66F 9/07504 |
| 10,040,326 | B1 | * | 8/2018 | O'Connell | ............... B60D 1/46 |
| 2013/0022434 | A1 | * | 1/2013 | Uttech | .................... B66F 9/065 |
| | | | | | 414/495 |

OTHER PUBLICATIONS

Albany County Fasteners, Zinc Plated Steel Fasteners, May 18, 2017 (Year: 2017).*

* cited by examiner

*Primary Examiner* — Jacob D Knutson
*Assistant Examiner* — Abigail R Hymel
(74) *Attorney, Agent, or Firm* — F. Rhett Brockington

(57) ABSTRACT

An apparatus fitted onto the forks of a forklift assembly for moving trailers, wherein the apparatus includes a right and a left rectangular tubular sections that are large enough to accommodate a fork. The sections are joined with a spanning beam having a center mounted trailer ball. The spanning beam is welded to the right and the left sections. A clamping element is mounted on a top wall of each section proximate to the rear of each section. Leveling elements are frontally affixed partially occluding an upper front opening of each section, such that tips of a fork are wedged under the leveling element and projecting beyond the front opening. Tightening the clamping elements secures attachment to the forks preventing the apparatus from sliding or rocking.

15 Claims, 7 Drawing Sheets

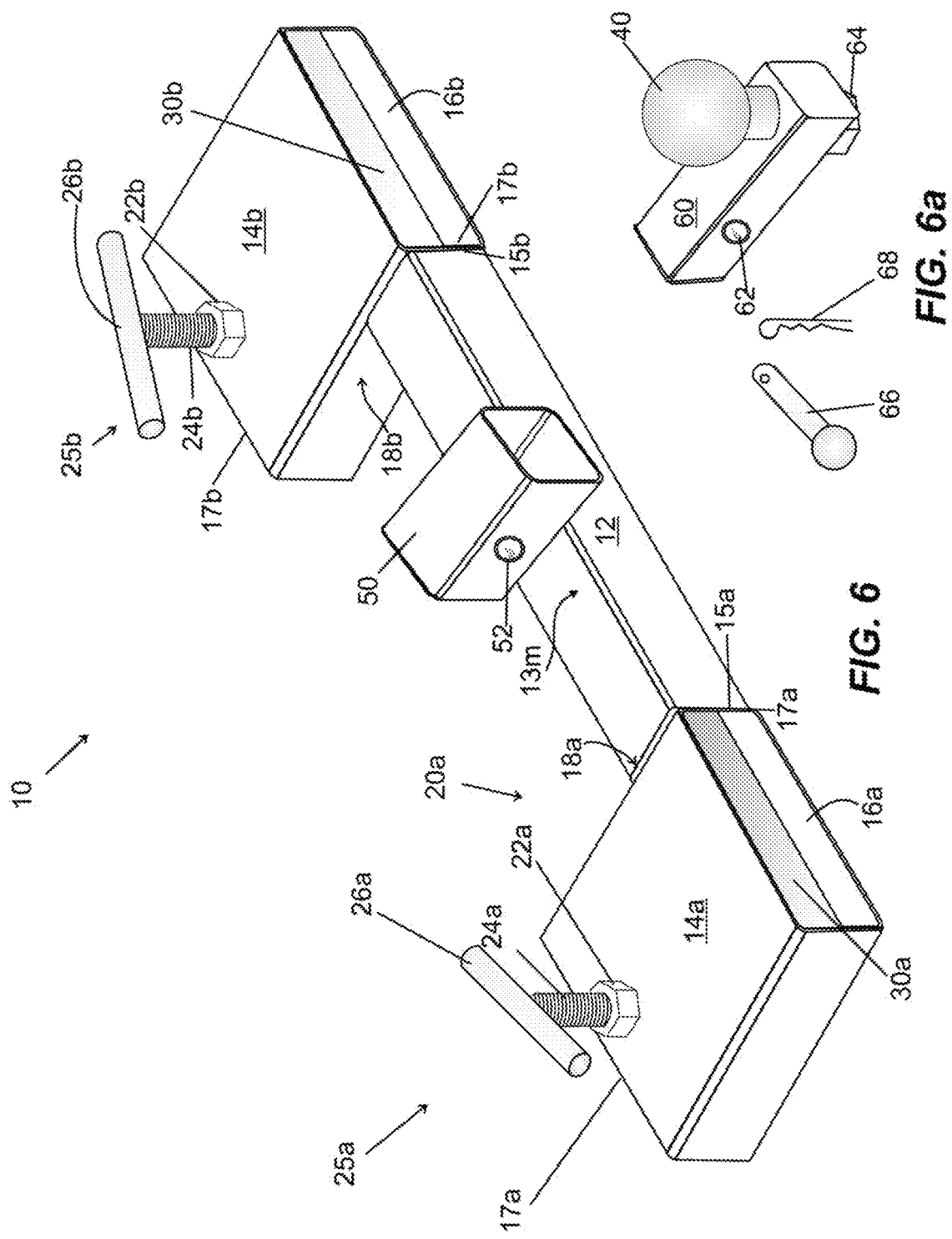

APPARATUS THAT FACILITATES MOVING A TRAILER

CROSS-REFERENCES TO RELATED APPLICATIONS

The present patent application/patent claims the benefit of priority of U.S. Provisional Patent Application No. 62/803,931, filed on Feb. 11, 2019, and entitled "APPARATUS THAT FACILITATES MOVING A TRAILER", the contents of which are incorporated in full by reference herein.

BACKGROUND OF THE INVENTION

1. Field of the Invention

The present invention relates generally to forklifts and tractors having forklift assemblies, and more particularly the invention is an apparatus that can be easily handled by one person and without tools, and can be quickly fitted onto forks of a forklift assembly, therein enabling movement of a trailer fitted with a trailer ball receiver. The apparatus requires no modification of the forks and the apparatus does not shift nor rock after being fitted to the forks.

2. Background

Forklifts having a forklift assembly are commonly used to move loaded and empty pallets around warehouses, sheds and paved lots. Most forklifts have relatively smooth tires and are not well suited for unpaved surfaces, such as a field or gravel driveway. Traditional forklifts are not particularly well suited for moving trailers such as boat trailers, utility trailers, and in general, any trailer having a trailer ball receiver for hitching to a ball.

Delton Friesen, in U.S. Pat. No. 6,390,489, teaches a device 100 that enables a forklift fork to transport trailers or other mobile vehicles. The device is secured to a fork using a large pin 130 and a cotter pin 131, wherein the large pin intersects a hole 113 drilled through the fork 112, as shown in FIG. 2. Friesen refers to the fork as a beam.

Moving even a small trailer can generate enough force to cause a modified fork to be damaged. After the ball is removed and the forks are appropriately spread, the damage can produce an unleveled lift of a pallet.

Robert E. Galloway, Sr recognized that if the device was attached to both forks, damage to the forks was less likely. Galloway, in U.S. Pat. No. 6,135,701, teaches a portable trailer hitch device being attached to the forks of a fork lift truck or similar motorized vehicle. The device discloses an upper and lower frame member separated by spacer plates whereby the forks of the fork lift truck can be slideably inserted into slots between the upper and lower frame members. The upper frame member has nut and bolt tightening members, which secure the upper and lower frame members to the forks. Galloway's device includes a generally vertically standing rectangular shaped plate 28 that is centrally mounted thereon and a connecting means 30 for attaching a chain 32 from the device to the forklift. The chain 32 prevents the device from being pulled off the forks.

To accommodate moving pallets of materials and trailers over unpaved surfaces tractors, fitted with a forklift assembly, are typically employed. Generally, tractor forklift assemblies aren't used for high lifts, in comparison to forklifts used in warehouses that have a smooth floor. Often unpaved surfaces are not level, and a high vertical lift is unsafe, as a vertical lift should be aligned with the earth's gravitation. A lift on an uneven surface is difficult and problematic. The advantage of a tractor is its large wheels can easily accommodate most unpaved surfaces, but the lift will often not be vertically aligned with the earth's gravitation.

SUMMARY OF THE INVENTION

Broadly, the present invention is an apparatus that can be fitted onto the forks of a forklift assembly, wherein the forklift assembly is found on a forklift and similarly on a tractor fitted with the forklift assembly, wherein the apparatus enables movement of a trailer without damaging the forks.

An object of the invention is that the apparatus can be fitted to a wide variety and sizes of forks.

A second object of the invention is that the apparatus can be fitted proximate to an end of both forks and the apparatus does not require a large frame, nor the need for a chain to secure the apparatus to the tractor or the forklift.

A third object of the invention is that the apparatus is light enough that it can be installed or removed singlehandedly without tools.

A fourth object of the invention is that after fastening the apparatus, in contrast to all previous forklift adaptations it does not rock, as it is secured to both forks, and both forks are wedged and clamped, regardless of the amount of taper.

A fifth object of the invention is that the invention is robust and low maintenance and has a good resistance to outdoor conditions.

A sixth object of the invention is that a chain connecting the trailer to the apparatus is not needed, but can be attached if desired.

These and other objects and advantages of the present invention will be readily appreciable from the following description of preferred embodiments of the invention and from the accompanying drawings and claims.

BRIEF DESCRIPTION OF THE DRAWINGS

The foregoing invention will become readily apparent by referring to the following descriptions and the appended drawings in which:

FIG. 6 is an elevated perspective view of a modified embodiment of the invented apparatus shown in FIG. 1, wherein instead of a trailer ball, the apparatus has a trailer hitch receiver tube (square tubing) having a square tubular opening; and FIG. 6a is an elevated perspective view of a trailer ball affixed on a ball mount shaft, which includes a square bar with a vertical hole for a trailer ball with a threaded rod, a trailer nut, and a horizontal hole for a shaft pin, and a shaft clip.

DETAILED DESCRIPTION OF THE INVENTION

Illustrative embodiments and exemplary applications are described with reference to the accompanying drawings to disclose the advantageous teachings of the present invention.

Various embodiments of the invention are described more fully hereinafter with reference to the accompanying drawings, in which some, but not all of the embodiments of the invention are shown in the figures. Indeed, these inventions may be embodied in many different forms and should not be construed as limited to the embodiments set forth herein; rather, these embodiments are provided so that this disclosure will satisfy applicable legal requirements. Those having ordinary skill in the art and access to the teachings provided herein will recognize addition.

Figure 1:
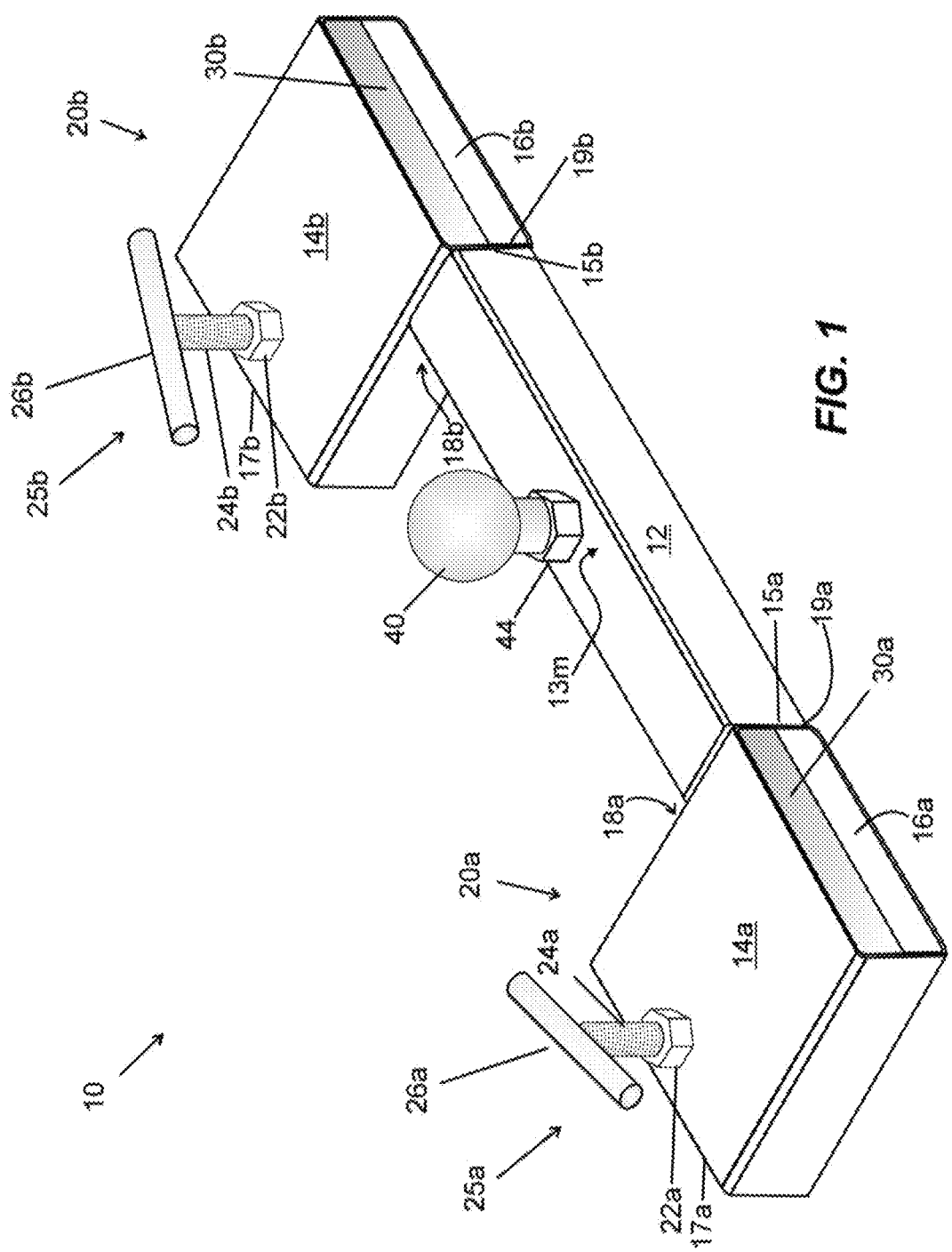
FIG. 1 is an elevated perspective view of an apparatus that can be fitted onto the forks of a forklift assembly, wherein the forklift assembly is found on a forklift and similarly on a tractor fitted with the forklift assembly, wherein the apparatus enables movement of a trailer without damaging the forks.

As illustrated in FIG. 1, the invention is an apparatus that facilitates moving a trailer using a forklift and similarly using a tractor fitted with the forklift assembly. An advantage of the apparatus is that it can be easily installed without tools, the installation does not require any modification of the forks, and the apparatus is very stable, not subject to rocking which can have deleterious side effects.

The apparatus 10 includes a right and a left rectangular tubular sections of metal tube 20a and 20b, which are large enough to accommodate the forks. In an exemplary embodiment each metal tube section is about 2 inches high by about 6 inches wide by about 6 inches long, and is made of steel. The inside dimensions of each tubular section is about 1.6 inches high by about 1.6 inches wide by about 6 inches long. The rectangular tubular sections 20a and 20b are joined by a spanning beam 12, which preferably is at least as high as the right and the left rectangular tubular sections. The spanning beam 12 not only joins and supports the right rectangular tubular section 20a and the left rectangular tubular section 20b, but the spanning beam also functions as the hitch point for trailers (not shown) having a trailer ball receiver. Trailer hitch safety chains could also be attached to the spanning beam 12. The spanning beam's dimensions are selected to move trailers having a ball receiver. It is anticipated that the spanning beam size could be increased, for example from a square tube that is about 2 inches high OD by 2 inches wide OD, to a rectangular tube that is about 3-4 inches wide OD, resulting in only an incremental increase in weight, which is still within the spirit of the invention—keep it light.

The illustrated spanning beam 12 can handle a 2 inch trailer ball, which is nominally rated at 5000 lbs. As shown in FIG. 1, the spanning beam 12 is a square tube section about 2 inches high by about 2 inches wide by 12 inches long, and is made of steel. The illustrated square tube has a wall thickness of about 3/16 inches. The right and left ends 15a,15b of the spanning beam 12 are welded to the right medial side wall 18a and to the left medial side walls 18b of rectangular tubular sections 20a and 20b. The right and left weld lines 19a,19b of the spanning beam 12 are substantially flush with the medial sides and front edges of the right and left rectangular tubular sections 20a,20b.

The trailer ball 40 is centered on the top side 13m of the spanning beam 12 with a trailer ball nut 44 that is welded to the top side 13m. A right and a left top wall on 14a,14b of the right and the left rectangular tubular sections 20a,20b respectively have a right and a left clamping element 25a, 25b mounted on the right and the left top wall 14a,14b respectively proximate to right and left rear openings 17a, 17b. The right and the left clamping elements 25a,25b respectively include a handle on a threaded rod 25a,25b. The illustrated right and left handles 26a,26b respectively are smooth rods welded to the right threaded rod 24a and the left threaded rod 24b. The threaded rods 24a,24b are screwed into the mounted nuts 22a,22b, which are welded to the top walls 14a,14b proximate to rear openings 17a,17b. Each of the top walls 14a,14b has a coaxial aperture (not visible) to provide access to an interior of the rectangular tubular sections 20a,20b. As will be shown in the following figures, the clamping elements 25a,25b can be screwed down until the threaded rod is in forceful contact with an upper surface of each fork.

Figure 2:
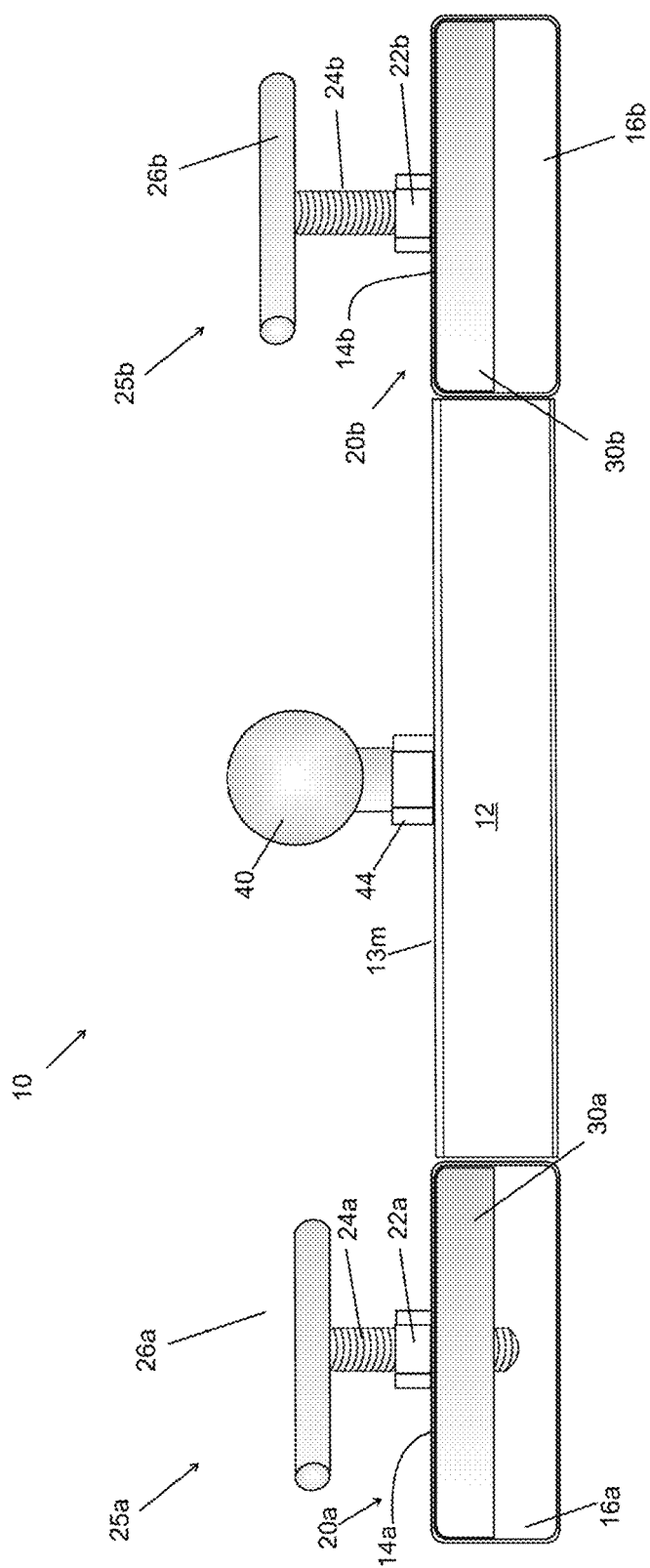
FIG. 2 is a frontal view of the invented apparatus illustrated in FIG. 1.

FIG. 2 is the frontal view of the apparatus 10 illustrated in FIG. 1. As shown in FIGS. 1 and 2, a top portion of the front openings 16a,16b of the right and the left rectangular tubular sections 20a,20b is occluded. Each of the rectangular tubular sections has a right leveling element 30a and a left leveling element 30b. In a preferred embodiment the right leveling element and the left leveling element are metal blocks 30a,30b. The leveling elements partially occlude the right rectangular tubular section 20a and the left rectangular tubular section 20b. The metal blocks are affixed (welded) to the right top wall 14a and the left top wall 14b; and are substantially flush with the front openings 16a, 16b of the right and the left rectangular tubular sections 20a,20b. The dimensions of the illustrated embodiments of the leveling elements 30a,30b are as follows. Both leveling elements 30a,30b are slightly less than about 5.6 inches long by about 1 inch thick by about 1 inch wide.

Figure 4:
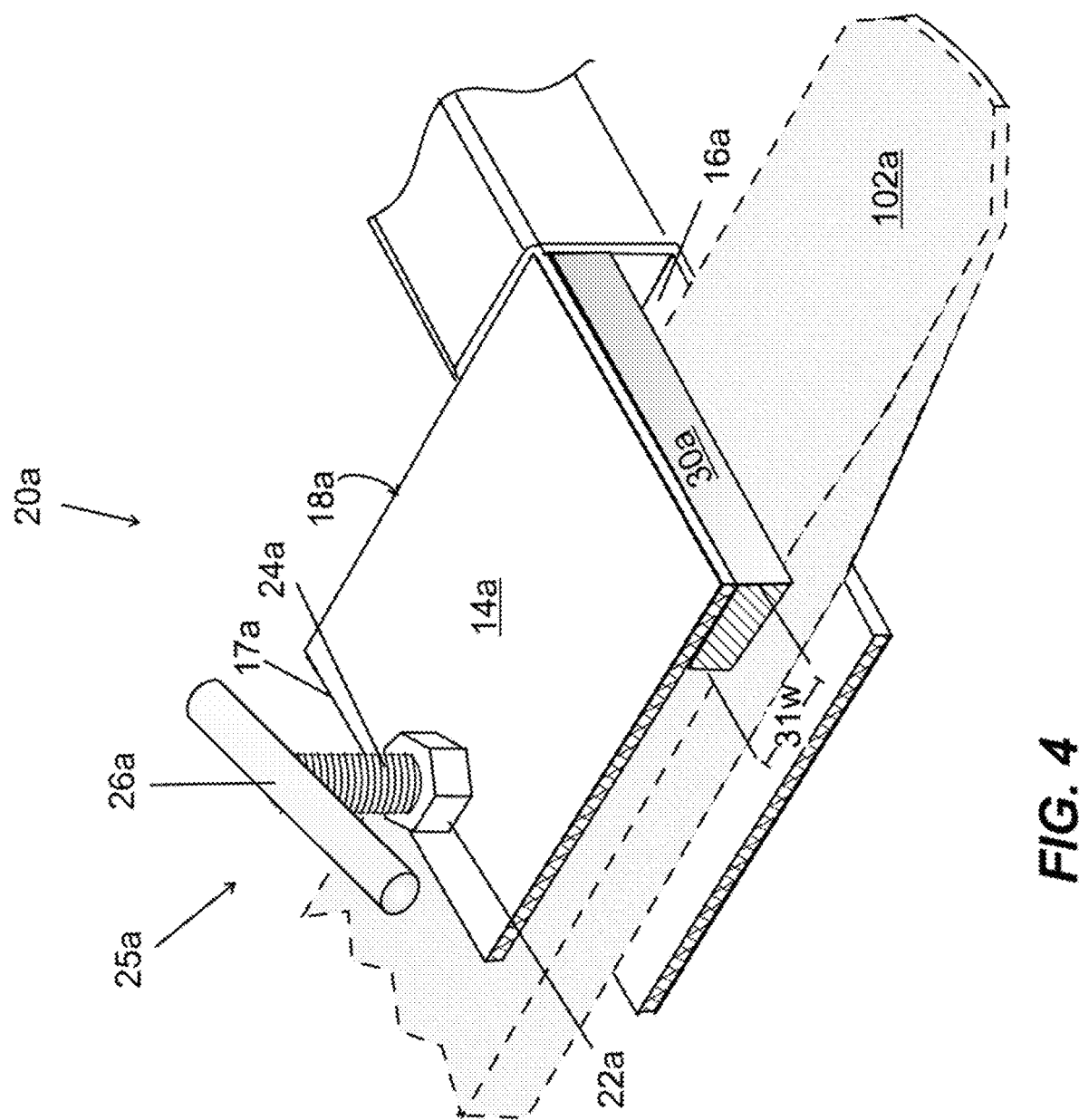
FIG. 4 is a cross-sectional elevated perspective view of the apparatus taken along sectional line 4-4 shown in FIG. 3, illustrating a leveling element that prevents rocking of the apparatus when it is affixed to the forks, wherein a frontal portion of the right fork is wedged under a right leveling element that is located on a right front of a right rectangular tubular section and clamped with a right clamping element located on a right top wall proximate to a right rear opening 17a of the right rectangular tubular section. The right clamping element has a hand tightened threaded rod that when tightened clamps a bottom sectional surface of the right fork against a rearward interior bottom of the right rectangular tubular section of the apparatus, such that when both the right fork and the left fork are wedged and clamped the apparatus is stable even though the right fork and the left fork are tapered.

FIG. 4 illustrates a sectional view of the right leveling element 30a, wherein the right metal block has a cross-sectional width 31w of about 1 inch.

In an exemplary embodiment of the clamping element, each of the handles 26a,26b is a steel rod having a length of about four inches and a diameter of about 0.5 inches. Each handle is about orthogonally connected to one of the threaded rods 24a, 24b. The threaded rods 24a, 24b have a diameter of about 0.6 inches and a length of about 3 inches to about 4 inches. Each threaded rod passes through the indicated nut 22a,22b; wherein the nuts 22a,22b are welded to the top walls 14a,14b; and are proximate to rear openings 17a,17b. As previously taught there is a coaxial aperture (not visible) in each of the top walls 14a,14b; wherein, individually, said coaxial apertures respectfully provide access into each rectangular tubular section 20a,20b. The mounted nuts 22a,22b are preferably hex nuts that are 5/8"-11 with zinc finish grade A finished. A lower end of each threaded rods is substantially blunt and smooth, such that when tightened against a fork the end of the rod does not significantly mar the finish of the fork.

The trailer ball 40 is affixed to an upper wall 13m of the square tube section 12 using a larger nut 44 preferably 3/4"-16 zinc finish grade A hex nut. A 2" trailer ball 40 typically includes a threaded shaft that is compatible with the 3/4"-16 hex nut. The square tube section 12 also has an aperture (not visible) for the trailer ball threaded shaft to access the square tube section 12.

Figure 5:
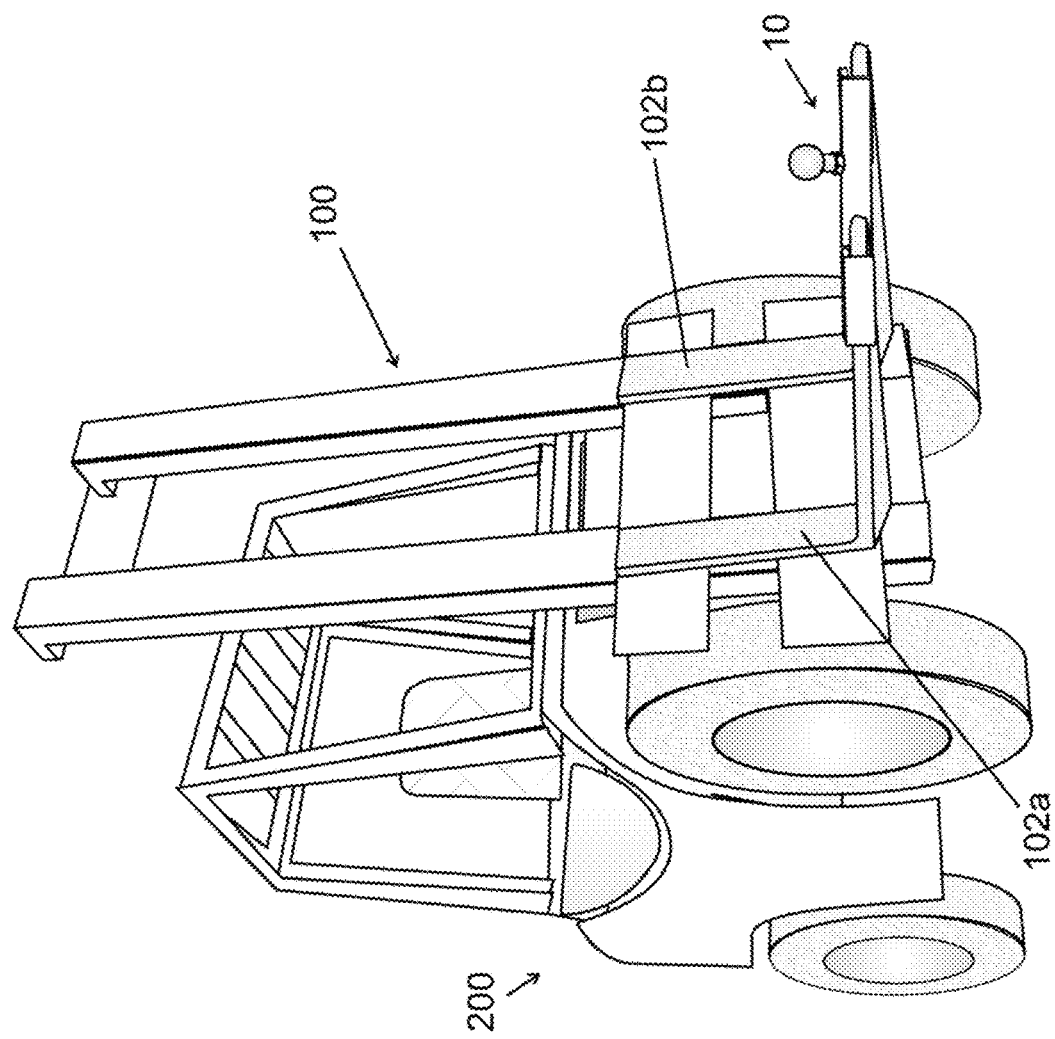
FIG. 5 is a substantially an angled perspective front view of the invented apparatus mounted on a forklift fitted with a forklift assembly, wherein the apparatus is mounted on the forks so that it is proximate to the tips of the forks.

The invented apparatus 10 is mounted on forks having a right fork 102a and a left fork 102b of a forklift assembly 100. The forklift assembly 100 is shown is in FIG. 5 mounted on forklift 200. Note, in FIG. 3 the forks are illustrated with dashed lines to indicate that the forks are not per se elements of the invented apparatus 10. Only the tips can project beyond the block 30a,30b through the partially occluded frontal openings 16a,16b. In one embodiment the right and left frontal occluded openings have a height of about 1.0 inches to about 0.6 inches.

The apparatus can be fastened to the right fork with at least two contact points within the right rectangular tubular section and fastened to the left fork at least two contact points within the left rectangular tubular by simultaneous sliding the apparatus onto both the right fork and the left fork, wherein the right fork and the left fork become wedged under the right leveling element (a first right contact point) and the left leveling element (a first left contact point), respectively; and then hand tightening the right clamping element providing (a second right contact point) and the left clamping element providing (a second left contact point). The apparatus is therein secured to the forks, which prevents the apparatus from sliding or rocking when moving a trailer.

Figure 3:
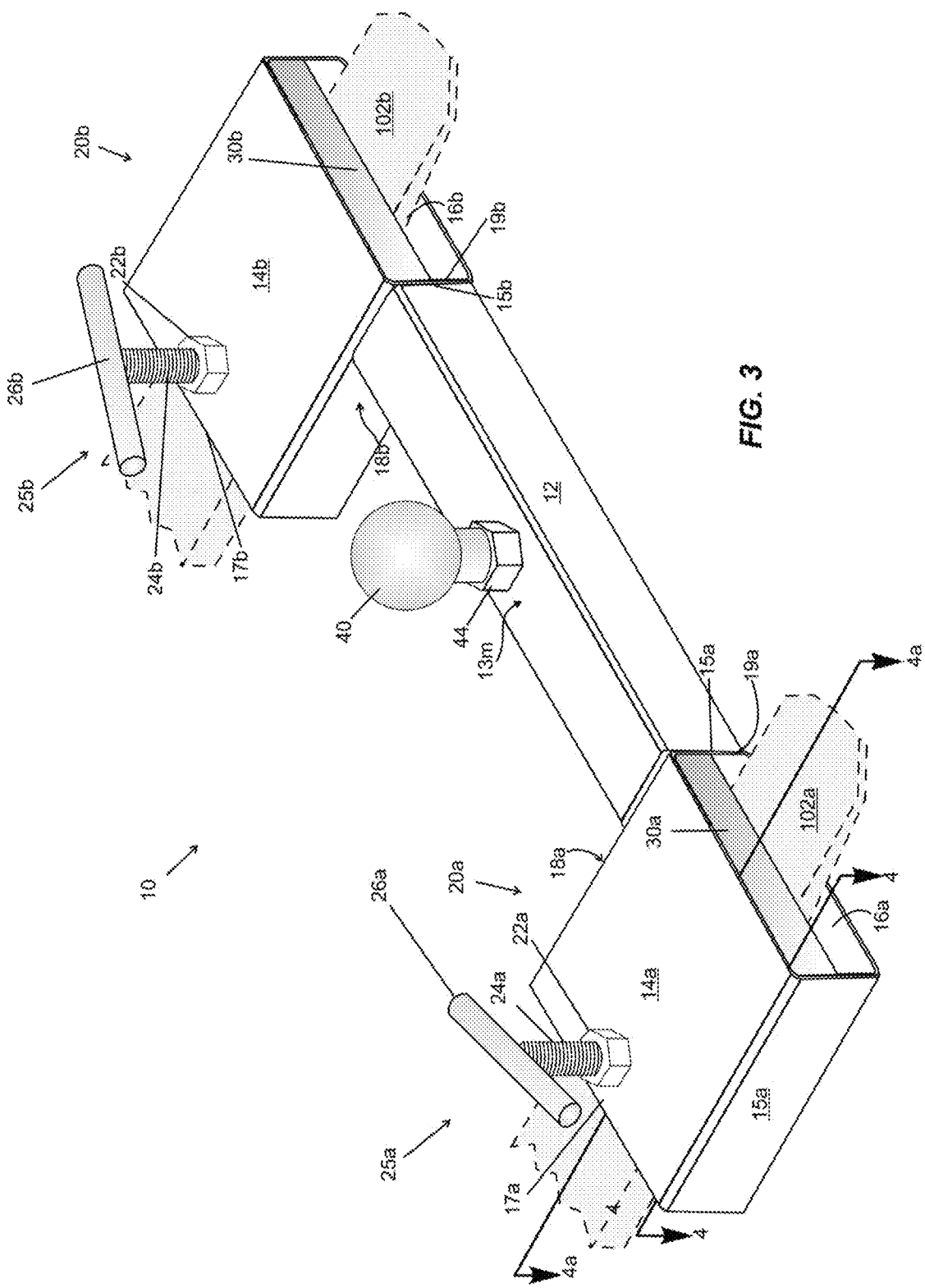
FIG. 3 is an elevated perspective view of the invented apparatus mounted on the forks of a partially illustrated forklift assembly, wherein the right fork and the left fork are illustrated with dashed lines to indicate that the forks are not per se elements of the invented apparatus.
Figure 4A:
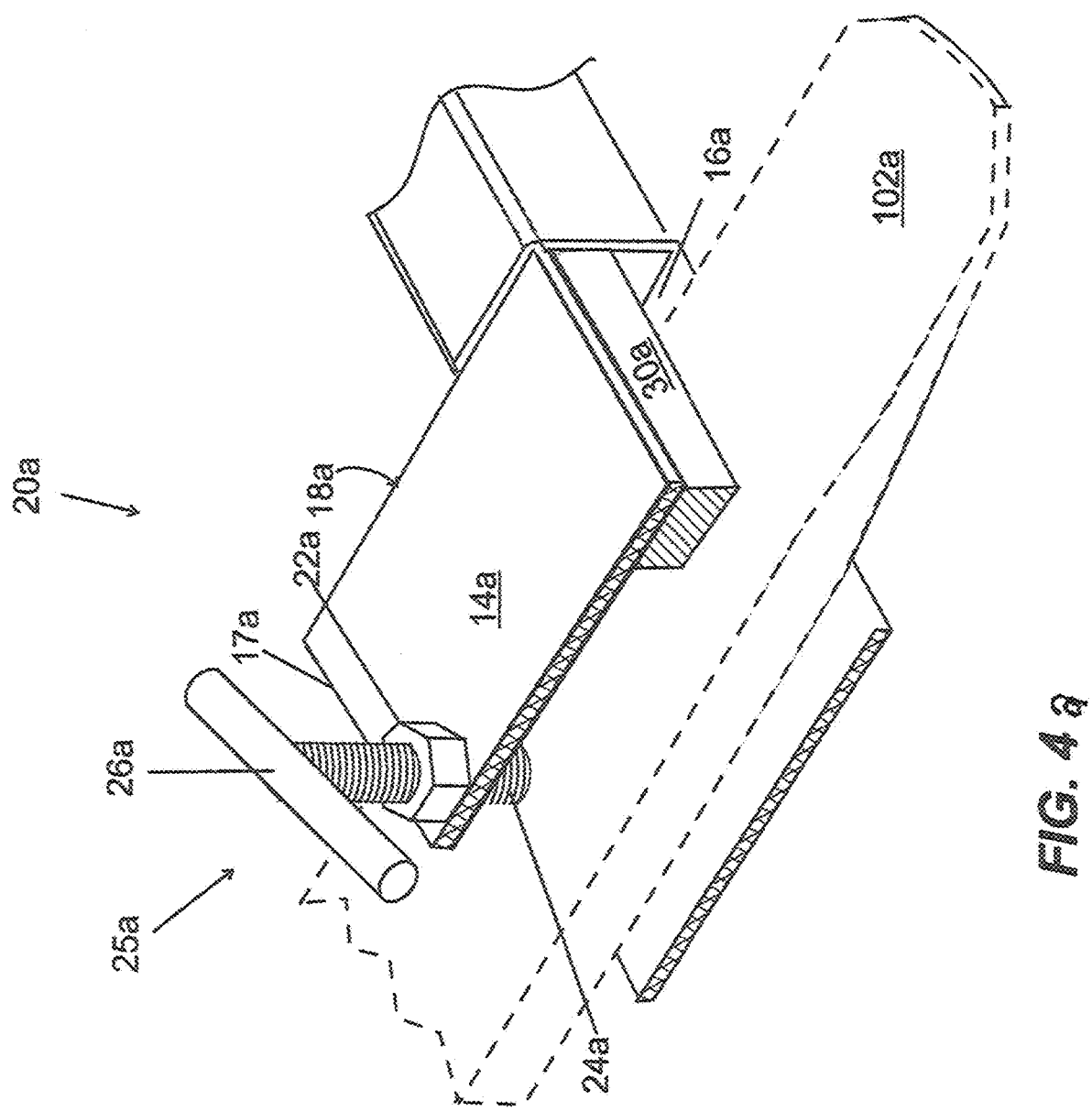
FIG. 4a is a cross-sectional elevated perspective view of the apparatus taken along sectional line 4a-4a shown in FIG. 3, illustrating the interaction of the right leveling element and the right clamping element, wherein the right fork, and similarly the left fork, each have at least two contact points therein providing a stabilized apparatus, which cannot rock and will not slide.

FIG. 4 and FIG. 4a illustrate how leveling elements 30a, 30b prevent rocking of the apparatus when it is mounted on the forks. For clarity only the right rectangular tubular section 20a is shown, but the left rectangular tubular section 20b is substantially the mirror image of the right section 20a. The right distal sidewall 15a shown in FIG. 3 is cut away in FIG. 4, revealing the interior of the rectangular tubular section 20a.

The apparatus 10 is fastened to each of the two forks 102a, 102b of the forklift assembly 100 as each fork is wedged under the leveling element proximate to the front opening, and clamped by the clamping element 25a, 25b proximate the rear opening 17a, 17b.

Fork 102a is wedged under the leveling element 30a, and as shown in the cross-sectional view of FIG. 4a, the threaded rod 24a of the clamping element 25a is tightened against a thicker portion of the fork 102a. The apparatus is stable even though the inserted fork is tapered, because each fork is secured at two contact points, jammed beneath the leveling element 30a and compressed by the clamping element 25a. Likewise, fork 102b is also secured at two contact points, jammed beneath the leveling element 30b and compressed by the clamping element 25b. The apparatus 10 is stable and cannot rock, and cannot slide as the friction is sufficiently high that a towed trailer will not pull the apparatus 10 off the forks. A chain from the apparatus 10 to the tractor or forklift 200 is not needed.

A modified embodiment of the invented apparatus 10 is shown in FIG. 6, wherein instead of a trailer ball, the apparatus has a trailer hitch tube receiver 50. The trailer hitch tube receiver 50 is substantially a square tube with a rearward facing opening, and on opposing sides of the square tube are a right side opening 52 and an opposing left side opening (not visible). The right and left side openings 52 are aligned, therein permitting a shaft 60, as shown in FIG. 6a, to be received, therein allowing alignment of openings 52 with horizontal hole 62 and insertion of a shaft pin 66. The shaft pin 66 is secured with a shaft clip 68. Note, lighter weight trailers are typically fitted with a trailer hitch ball receiver (not shown) that has a socket with a cam lock that receives the ball. Trailer hitch ball receivers are typically mounted on a tongue of lighter weight trailers. The illustrated trailer hitch tube receiver 50 receives the shaft 60, which as shown is a square bar or a variation thereof, wherein the shaft has at least one ball 40.

As shown in FIG. 6a, the trailer ball 40 is affixed on the shaft 60, utilizing a vertical hole (not visible) for the trailer ball 40 with a hitch nut 64.

It is recognized that there are a variety of shafts, some straight and others curved, wherein the shaft can have up to four trailer balls. A two inch ball is illustrated as it is becoming relatively standard for light trailer hitch tube receivers, but the reader can easily adapt the illustrated embodiment and the modified embodiment to be fitted with a variety of different sizes of trailer balls.

The apparatus is typically coated to provide weather protection and ascetic appeal. Dipped threaded elements like threaded rods and nuts are typically not painted, and are available in various grades of steel, including stainless steel.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. An apparatus that facilitates moving a trailer which can be fitted onto forks of a forklift assembly having a right fork with a right tip thickness and a left fork with a left tip thickness, wherein the forklift assembly is affixed on a forklift or a tractor, wherein said apparatus comprises:
   a right rectangular tubular section and a left rectangular tubular section sized to receive the right fork and the left fork;
   wherein said right rectangular tubular section is comprised of a right wall thickness, a right length, a right width and a right height, a right rear opening, a right front opening, a right medial side wall, a right distal side wall, and a right bottom wall and a right top wall that taken together spatially define a right interior with a right interior height and a right interior width;

wherein said right rectangular tubular section is further comprised of a right leveling element that comprises a right bar that is proximate to the right front opening affixed to a right interior surface of the right top wall, said right leveling element partially occluding a right upper portion of the right front opening, therein providing a right frontal occluded opening with a right frontal opening height that is greater than the right tip thickness of the right fork;

wherein said left rectangular tubular section is comprised of a left wall thickness, a left length, a left width and a left height, a left rear opening, a left front opening, and a left medial side wall, a left distal side wall, and a left bottom wall and a left top wall that taken together spatially define a left interior with a left interior height and a left interior width;

wherein said left rectangular tubular section is further comprised of a left leveling element that comprises a left bar that is proximate to the left front opening affixed to a left interior surface of said left top wall, said left leveling element partially occludes a left upper portion of the left front opening, therein providing a left frontal occluded opening with a left frontal opening height that is greater than the left tip thickness of the left fork;

a right clamping element mounted on the right top wall of said right rectangular tubular section proximate to the right rear opening, where the right clamping element comprises a right handle, a right threaded rod and a mounted right nut that is welded to the right top wall, wherein the right threaded rod can be screwed down through a right coaxial aperture in the right top wall into the right interior of said right rectangular tubular section, therein clamping an inserted right fork against the right bottom wall;

a left clamping element is mounted on the left top wall of said left rectangular tubular section proximate to the left rear opening, where the left clamping element comprises a left handle, a left threaded rod and a left mounted nut that is welded to the left top wall, wherein the left threaded rod can be screwed down through a left coaxial aperture in the left top wall into the left interior of said left rectangular tubular section, therein clamping an inserted left fork against the left bottom wall;

a spanning beam which is a tubular section, wherein said spanning beam has a left end and a right end, where the right end is welded to the right medial side wall of said right rectangular tubular section proximate to the right front opening and the left end is welded to a left medial side wall of said left rectangular tubular section proximate to the left frontal opening, said spanning beam therein joining and holding said right rectangular tubular section parallel to said left rectangular tubular section;

said spanning beam further comprises a ball nut for a trailer ball, where the ball nut is welded to a center top side of said spanning beam;

wherein said spanning beam can accommodate at least one trailer ball; and wherein the left leveling element functions to wedge the inserted left fork against the left bottom wall and the right leveling element functions to wedge the inserted right fork against the right bottom wall.

2. The apparatus according to claim 1, wherein said apparatus can be fastened to both the right and the left inserted forks by hand tightening the right and the left clamping elements until both the right and the left inserted forks are in frictional contact at a plurality of contact points within said right and said left rectangular tubular sections, which prevents the apparatus from sliding or rocking when pulling a hitched trailer.

3. The apparatus according to claim 1, wherein the left rectangular tubular section is 2 inches high by 6 inches wide by 6 inches long.

4. The apparatus according to claim 1, wherein the right rectangular tubular section is 2 inches high by 6 inches wide by 6 inches long.

5. The apparatus according to claim 1, wherein the spanning beam is a square tube that is 12 inches long by 2 inches high by 2-4 inches wide.

6. The apparatus according to claim 1, wherein the right leveling element is 5.6 inches long by 1 inch thick by 1 inch wide.

7. The apparatus according to claim 1, wherein the left leveling element is 5.6 inches long by 1 inch thick by 1 inch wide.

8. The apparatus according to claim 1, wherein the rectangular tubular sections are made of a metal.

9. The apparatus according to claim 8, wherein the metal is steel.

10. The apparatus according to claim 1, wherein the spanning beam, the right rectangular tubular section and the left rectangular tubular section has walls that are $3/16$ inches thick.

11. The apparatus according to claim 1, wherein the apparatus is coated to provide weather protection and esthetic appeal.

12. The apparatus according to claim 1, wherein the right mounted nut and the left mounted nut are both hexagonal steel nuts with a zinc finish.

13. The apparatus according to claim 1, wherein the right frontal opening height and the left frontal opening height are 1 inch to 0.6 inches.

14. An apparatus that facilitates moving a trailer which can be fitted onto forks of a forklift assembly that has a right fork with a right tip thickness and a left fork with a left tip thickness, wherein the forklift assembly is affixed on a forklift or a tractor, wherein said apparatus comprises:

a right rectangular tubular section comprised of a right wall thickness, a right length, a right width and a right height, a right rear opening, a right front opening, a right medial side wall, a right distal side wall, and a right bottom wall and a right top wall that taken together spatially define a right interior with a right interior height and a right interior width;

wherein the right rectangular tubular section is further comprised of a right leveling element that comprises a right bar that is proximate to the right front opening affixed to a right interior surface of the right top wall, said right leveling element partially occluding a right upper portion of the right front opening, therein providing a right frontal partially occluded opening with a right frontal opening height that is greater than the right tip thickness of the right fork;

a left rectangular tubular section comprised of a left wall thickness, a left length, a left width and a left height, a left rear opening, a left front opening, and a left medial side wall, a left distal side wall, and a left bottom wall and a left top wall that taken together spatially define a left interior with a left interior height and a left interior width;

wherein said left rectangular tubular section is further comprised of a left leveling element that comprises a left bar that is proximate to the left front opening affixed to a left interior surface of said left top wall, said left leveling element partially occludes a left upper portion of the left front opening, therein providing a left frontal partially occluded opening with a left frontal opening height that is greater than the left tip thickness of the left fork;

a right clamping element mounted on the right top wall of said right rectangular tubular section proximate to the right rear opening, where the right clamping element comprises a right handle, a right threaded rod and a mounted right nut that is welded to the right top wall, wherein the right threaded rod can be screwed down through a right coaxial aperture in the right top wall into the right interior of said right rectangular tubular section, therein clamping an inserted right fork against the right bottom wall;

a left clamping element is mounted on the left top wall of said left rectangular tubular section proximate to the left rear opening, where the left clamping element comprises a left handle, a left threaded rod and a left mounted nut that is welded to the left top wall, wherein the left threaded rod can be screwed down through a left coaxial aperture in the left top wall into the left interior of said left rectangular tubular section, therein clamping an inserted left fork against the left bottom wall;

a spanning beam which is a tubular section, wherein said spanning beam has a left end and a right end, where the right end is welded to the right medial side wall of said right rectangular tubular section proximate to the right front opening and the left end is welded to a left medial side wall of said left rectangular tubular section proximate to the left frontal opening, said spanning beam therein joining and holding said right rectangular tubular section parallel to said left rectangular tubular section;

said spanning beam further comprises a trailer hitch tube receiver that comprises a square tube that is orthogonal to said spanning beam with a rearward facing opening and a forward facing opening, wherein said trailer hitch tube receiver has a right side opening and an opposing left side opening; and wherein the left leveling element functions to wedge an inserted left fork against the left bottom wall and the right leveling element functions to wedge an inserted right fork against the right bottom wall.

15. The apparatus according to claim 14, wherein said apparatus can be fastened to both the right and the left inserted forks by hand tightening the right and the left clamping elements until both the right and the left inserted forks are in frictional contact at a plurality of contact points within said right and said left rectangular tubular sections, which prevents the apparatus from sliding or rocking when pulling a hitched trailer.

* * * * *